UNITED STATES PATENT OFFICE.

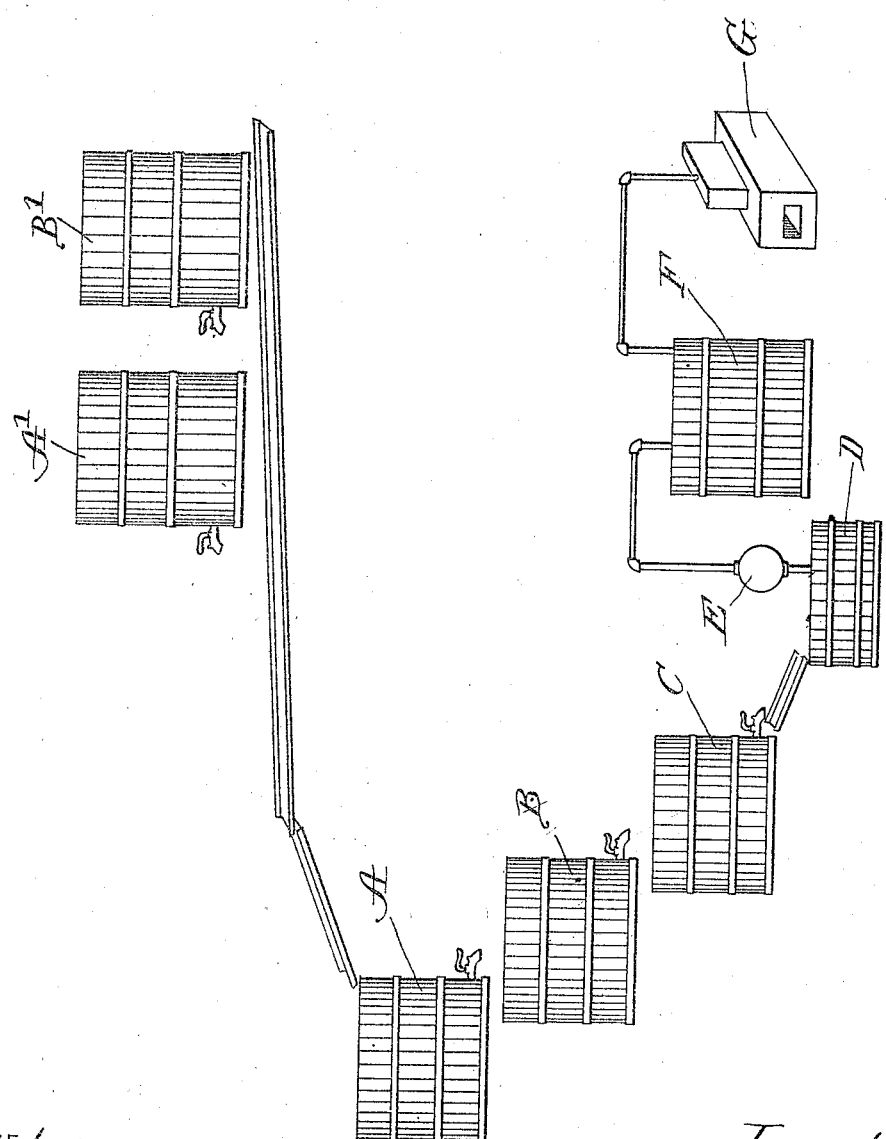

CHARLES J. BEST, OF OAKLAND, CALIFORNIA.

PROCESS OF TREATING ORES.

1,084,600. Specification of Letters Patent. Patented Jan. 20, 1914.

Application filed April 14, 1910. Serial No. 555,489.

*To all whom it may concern:*

Be it known that I, CHARLES J. BEST, a citizen of the United States, residing at Oakland, in the county of Alameda and State of California, have invented a certain new and useful Improvement in the Process of Treating Ores, of which the following is a specification.

My invention relates to a process for the extraction of metals from ores and an apparatus for carrying out the process is partially illustrated in my drawing which is to be taken as diagrammatic.

The ore is first ground, preferably fine enough to pass a fifty mesh sieve. It is then preferably spread out in a layer not over eight inches deep on an oxidizing or sweating floor and after remaining for a period which experience will dictate, it is sprinkled with a preparing solution. This acid, oxidizing preparing solution is preferably made up of nitrate of potassium, $KNO_3$, ten pounds, nitric acid, $HNO_3$, ten pounds, permanganate of potassium, $KMnO_4$, one part, common salt, $NaCl$, twenty-five pounds, and sulfuric acid, $H_2SO_4$, twenty-five pounds, all by weight, in solution in one hundred and ninety gallons of water. This ore preferably after about four hours is placed in a roasting furnace and is then preferably distributed through a series of leaching tanks adapted each to discharge this leaching liquid into the next. Tanks are preferably filled to within a few inches of the top. I then prepare two separate leaching solutions which I call respectively my first leaching solution and my second leaching solution. The first leaching solution which is stored in the storage tank is made up of common salt, $NaCl$, eighty pounds, sulfuric acid, $H_2SO_4$, eighty-five pounds, black oxid of manganese, $MnO_2$, seven pounds, in solution in one hundred and forty-five gallons of water. My second leaching solution, which is preferably stored in tank $B^1$ is made up of nitrate of potassium, $KNO_3$, three pounds, sal ammoniac, $NH_4Cl$, three pounds, nitric acid, $HNO_3$, twenty-five pounds, common salt, $NaCl$, one hundred and fifty pounds, sulfuric acid, $H_2SO_4$, one hundred and twenty-five pounds, in solution in ninety-five gallons of water. It is a well-known fact that metals in ores such as I aim to reduce are frequently found in different chemical combinations and peculiar physical conditions and it is therefore desirable to use a plurality of leaching solutions, since if the ore is so combined as to be insoluble in one solution it may be soluble in another. In this way I am enabled to extract the last particle of the metal. I now discharge my first leaching solution into the first tank in the series until the ore therein is entirely covered and here I allow it to remain for preferably six hours or more. This solution is then allowed to run into the second tank where it is allowed to remain for preferably six hours or more. This solution is then allowed to run into the next tank of the series where it remains for a like period. The first solution thus passes successively through the ores in all of the leaching tanks in the series and there may be any desired number. It is finally run into the sump and pumped thence into the precipitating tank, after the first leaching solution has been discharged from the first leaching tank the second leaching solution is supplied to the same tank and it remains there for the predetermined period and passes thence in succession through the several tanks in like manner and finally through the sump into the precipitating tank where the two leaching solutions are commingled. Each of the leaching tanks is preferably supplied with some filtering means so that only the substances which are held in solution are carried with the liquids into the next succeeding tanks. I now apply any kind of precipitating means to the substances in the precipitating tank and I may preferably use an alkaline gas or electricity.

In the drawing, tank $A^1$ is a storage tank for the first leaching solution, tank $B^1$ is a storage tank for the second leaching solution. Tanks A, B and C are the leaching tanks arranged in order one above the other. Tank D is a sump, E a pump with proper pipes leading therefrom. F is the precipitating tank and G a diagrammatic illustration of an apparatus for producing the alkaline gas which may be used, the same being supplied through a proper pipe in connection with the precipitating tank. These structures are merely suggestive and the drawings diagrammatic.

I have shown a particular arrangement of tanks and devices for carrying out my process but of course they are merely suggestive as the process itself does not depend upon the particular arrangement of operating parts. I have suggested certain substances or solutions but it is equally evident that they may be greatly varied without departing from the spirit of my invention.

The preparing solution is preferably made of the materials indicated which are mixed together and allowed to remain ten hours before used. The second leaching solution when formed is preferably kept cool and in a dark room, the barrel loosely corked. These solutions, of course, will vary in proportions and strength and they may vary in substance to respond to the requirements of particular ores. Any person skilled in the art can speedily arrive at a proper mixture and proportion.

It will be understood that the function of the two leaching solutions is to combine with the metal in the ore and take it into solution from which it is subsequently precipitated, and owing to the different valences of the metal ingredients of the different ores and owing to the different valences of the different metals which may be treated by this process and which may appear in the same ore or in separate ores and may be treated separately or together as the case may be, it is desirable to have a plurality of leaching solutions.

I claim:

1. The process of extracting metals from ores which consists in subjecting the ores in a finely divided state to a preparing solution preferably made up of nitrate of potassium, nitric acid, permanganate of potassium, common salt and sulfuric acid, roasting them, and then subjecting the ores successively to a series of separate leaching solutions, then accumulating such leaching solutions in a precipitating tank, then treating the same by precipitating means.

2. The process of extracting metals from ores which consists in subjecting the ores in a finely divided state to a preparing solution, roasting them and then subjecting the ores successively to a series of separate leaching solutions one of said solutions preferably containing common salt, sulfuric acid, black oxid of manganese, then accumulating such leaching solutions in a precipitating tank, then treating the same by precipitating means.

3. The process of extracting metals from ores which consists in subjecting the ores in a finely divided state to a preparing solution, roasting them and then subjecting the ores successively to a series of separate leaching solutions, one of said solutions preferably containing common salt, sulfuric acid, black oxid of manganese, the other containing nitrate of potassium, sal ammoniac, nitric acid, common salt, sulfuric acid, then accumulating such leaching solutions in a precipitating tank, then treating the same by precipitating means.

4. The process of extracting metals from ores which consists in subjecting the ores in a finely divided state to a preparing solution preferably made up of nitrate of potassium, ten parts, nitric acid ten parts, permanganate of potassium one part, common salt twenty-five parts, and sulfuric acid twenty-five parts, roasting them, and then subjecting the ores successively to a series of separate leaching solutions, then accumulating such leaching solutions in a precipitating tank, then treating the same by precipitating means.

5. The process of extracting metals from ores which consists in subjecting the ores in a finely divided state to a preparing solution, roasting them and then subjecting the ores successively to a series of separate leaching solutions, one of said solutions preferably containing common salt eighty parts, sulfuric acid eighty-five parts, black oxid of manganese seven parts, then accumulating such leaching solutions in a precipitating tank, then treating the same by precipitating means.

6. The process of extracting metals from ores which consists in subjecting the ores in a finely divided state to a preparing solution, roasting them and then subjecting the ores successively to a series of separate leaching solutions, one of said solutions preferably containing nitrate of potassium, sal ammoniac, nitric acid, common salt, sulfuric acid, then accumulating such leaching solutions in a precipitating tank, then treating the same by precipitating means.

7. The process of extracting metals from ores which consists in subjecting the ores in a finely divided state to a preparing solution, roasting them and then subjecting the ores successively to a series of separate leaching solutions, one of said solutions preferably containing nitrate of potassium, three parts, sal ammoniac three parts, nitric acid twenty-five parts, common salt one hundred and fifty parts, sulfuric acid one hundred and twenty-five parts, then accumulating such leaching solutions in a precipitating tank, then treating the same by precipitating means.

8. The process of extracting metals from ores which consists in subjecting the ores in a finely divided state to a solution of nitrate of potassium, nitric acid, permanganate of potassium, common salt and sulfuric acid in solution and water, roasting the ores and then leaching them.

9. The process of extracting metals from ores which consists in subjecting the ores in a finely divided state to a solution in water of ten parts of nitrate of potassium, ten parts of nitric acid, one part permanganate of potassium, twenty-five parts of common salt and twenty-five parts of sulfuric acid, all by weight, roasting the product and then leaching it.

CHARLES J. BEST.

Witnesses:
RASCOE D. JONES,
CHAS. MURRELL.